US009300761B2

(12) United States Patent
Ryu et al.

(10) Patent No.: US 9,300,761 B2
(45) Date of Patent: Mar. 29, 2016

(54) CLIENT APPARATUS AND SERVER AND CONTROL METHOD THEREOF

(71) Applicant: SAMSUNG ELECTRONICS CO., LTD., Suwon-si (KR)

(72) Inventors: Ga-hyun Ryu, Suwon-si (KR); Sung-kee Kim, Hwaseong-si (KR); Hyun-woo Lim, Seoul (KR); Chun-Bae Park, Suwon-si (KR); Duk-gu Sung, Seoul (KR); Do-young Joung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 13/859,397

(22) Filed: Apr. 9, 2013

(65) Prior Publication Data

US 2014/0089391 A1   Mar. 27, 2014

(30) Foreign Application Priority Data

Sep. 24, 2012  (KR) .......................... 10-2012-0105966

(51) Int. Cl.
*G06F 15/16* (2006.01)
*H04L 29/06* (2006.01)
*G06F 17/24* (2006.01)

(52) U.S. Cl.
CPC .............. *H04L 67/42* (2013.01); *G06F 17/243* (2013.01)

(58) Field of Classification Search
CPC .............................. H04L 67/42; G06F 17/243
See application file for complete search history.

(56) References Cited

U.S. PATENT DOCUMENTS

| 6,587,599 | B1* | 7/2003 | Huang ........................... 382/284 |
| 8,112,813 | B1* | 2/2012 | Goodwin et al. ................ 726/27 |
| 2003/0234811 | A1 | 12/2003 | Kim |
| 2008/0117448 | A1* | 5/2008 | Ijams et al. .................. 358/1.15 |
| 2009/0031220 | A1 | 1/2009 | Tranchant et al. |
| 2010/0088606 | A1* | 4/2010 | Kanno ........................... 715/733 |
| 2011/0018844 | A1 | 1/2011 | Ko et al. |
| 2011/0063303 | A1 | 3/2011 | Choi et al. |
| 2012/0151334 | A1* | 6/2012 | Goodwin et al. ............. 715/256 |
| 2013/0117665 | A1* | 5/2013 | Tagliaferri et al. ............ 715/255 |

FOREIGN PATENT DOCUMENTS

| KR | 10-2004-0000223 A | 1/2004 |
| KR | 10-2006-0074341 A | 7/2006 |
| KR | 10-0884195 B1 | 2/2009 |

(Continued)

OTHER PUBLICATIONS

International Search Report, dated Dec. 31, 2013, issued by the International Searching Authority in counterpart International Application No. PCT/KR2013/007956.

(Continued)

*Primary Examiner* — Moustafa M Meky
(74) *Attorney, Agent, or Firm* — Sughrue Mion, PLLC (57) ABSTRACT

A client apparatus, a server, and a control method thereof are provided. The client apparatus includes a display, a user interface which receives a text input, a communication interface which transmits to the server information related to input text, a storage which receives a result of analysis of the information transmitted from the server and stores the same, and a controller which performs control operations so that, in response to the text input being received via the user interface after the result of the analysis received, the received text is converted based on a stored result of the analysis, before being displayed.

22 Claims, 7 Drawing Sheets

(56) References Cited

FOREIGN PATENT DOCUMENTS

| KR | 10-0945521 B1 | 3/2010 |
| KR | 10-2011-0028571 A | 3/2011 |
| KR | 10-1107640 B1 | 1/2012 |

OTHER PUBLICATIONS

Written Opinion, dated Dec. 31, 2013, issued by the International Searching Authority in counterpart International Application No. PCT/KR2013/007956.

* cited by examiner

CLIENT APPARATUS AND SERVER AND CONTROL METHOD THEREOF

CROSS-REFERENCE TO RELATED APPLICATIONS

This application claims priority from Korean Patent Application No. 10-2012-0105966, filed on Sep. 24, 2012, in the Korean Intellectual Property Office, the disclosure of which is incorporated herein by reference, in its entirety.

BACKGROUND

1. Field

Client apparatuses, methods, and servers consistent with what is disclosed herein relate to a client apparatus, a method of controlling the client apparatus, a server and a method of controlling the server. More particularly, the inventive concept relates to a client apparatus which communicates between a client apparatus and a server under a cloud display working environment, a method of controlling the client apparatus, a server and a method of controlling the server.

2. Description of the Related Art

Advancement of electronic technologies has enabled implementation of server-based structures. In a server-based structure, all of the applications are at the server, and a client apparatus accesses the server whenever it needs a program. The client apparatus does not have to download software, but rather executes all the applications on the server and then simply receives the resultant data instead. This particular structure is called a thin client network system or a zero client network system.

Under thin client or zero client environment, the client apparatus does not necessarily have a large memory or hard disk capacity. Provided that the client apparatus is networked with the server, the client apparatus also does not have to be equipped with a CD ROM drive or a floppy disk drive. Therefore, burdens such as increased network infrastructure, need for hardware (H/W) and software (S/W) upgrades of the existing PCs and increased maintenance costs, can be reduced.

Meanwhile, depending on a user request, a client apparatus, which is under a network environment, may receive a document directed to a job-related application which executes an image and displays the same. Accordingly, the user is able to work on a document using an input device which is physically connected to the client apparatus.

As the user works on documents under this working environment using an input device, such as a keyboard or a mouse, the client apparatus transmits to the server side the text input-related information, received via the input device, receives the processed image from the server as a response, and displays the same. This series of processes results in the user's text input appearing rather slowly on a screen of the client apparatus. As a result, the user does not feel that he/she has speedily processed information that he usually has when he does document work using a general "fat client" apparatus such as a desk top.

SUMMARY

Exemplary embodiments of the inventive concept may or may not overcome the above disadvantages and other disadvantages not described above. Also, the inventive concept is not required to overcome the disadvantages described above, and an exemplary embodiment of the inventive concept may not overcome any of the problems described above.

A technical concept of the exemplary embodiments is to provide efficient processing of a user-input text and displaying a result of the processing on a client apparatus which displays a job-related document through an application executing an image.

In one exemplary embodiment, a client apparatus which operates in communication with a server is provided. The client apparatus may include a display, a user interface which receives a text input, a communication interface which transmits text input-related information to the server, a storage which receives a result of analysis of the information transmitted from the server and stores the same, and a controller which, in response to a text input being received via the user interface after the result of the analysis received, the type of the received text is converted based on the stored result of the analysis before the converted text is displayed.

The text input-related information may include at least one of a content of the text, location information at which the text is inputted, and attribute information of the text.

In response to a user's additional manipulation related to the text input being received, the controller may transmit to the server additional user manipulation-related information, and may perform a control function so that an image which corresponds to the user's additional manipulation is received from the server and is displayed.

The controller may receive a result of analysis on the user's additional manipulation from the server and may perform a control function so that the information stored in the storage is updated based on the received result of the analysis.

In one exemplary embodiment, a server which communicates with a client apparatus is provided, which server may include a storage which stores user manipulation-related information regarding a user's manipulation made with respect to a text input screen provided by the client apparatus, a communication interface which receives from the client apparatus text input-related information, and a controller which analyzes the received information based on the information stored at the storage and controls so that a result of the analysis is transmitted to the client apparatus.

The text input-related information may include at least one of a content of the text, location information at which the text is inputted, and text attribute information, and the controller may perform a control function so that mapping information of the text input-related information is extracted from the user manipulation-related information and is transmitted to the client apparatus.

The user manipulation-related information may include at least one of location information at which the user's manipulation is generated and a type of the user's manipulation.

The controller may control so that an image which corresponds to the text input-related information is generated based on the result of the analysis and is transmitted to the client apparatus.

In one exemplary embodiment, a method of controlling a client apparatus which operates in communication with a server is provided, and which may include receiving a user's text input, transmitting text input-related information to the server, receiving a result of analysis on the information transmitted from the server, and storing the same, and in response to the text input being received after the result of the received analysis converting a type of the received text based on the stored result of the analysis before the converted text is displayed.

The text input-related information may include at least one of a content of the text, location information at which the text is inputted and attribute information relating to the text.

The control method may additionally include transmitting additional user manipulation-related information to the server, and receiving from the server an image which corresponds to the user's additional manipulation and displaying, in response to a user's additional manipulation related with the text input being received.

In response to receiving a result of analysis of the user's additional manipulation from the server, the method may additionally include updating the information stored at the storage based on the received result of the analysis.

In one exemplary embodiment, a method of controlling a server which controls operation of a client apparatus in communication with the client apparatus is provided. The control method may include receiving from the client apparatus text input-related information, analyzing the received text input-related information based on prestored user manipulation-related information, which is based on a user's manipulation made with respect to a text input screen provided by the client apparatus, and transmitting a result of the analysis to the client apparatus.

The text input-related information may include at least one of a content of the text, location information at which the text is inputted, and text attribute information, and the analyzing may include extracting mapping information of the text input-related information from the user manipulation-related information, and storing the same.

The user manipulation-related information may include at least one of location information at which the user's manipulation is generated and a type of user manipulation.

The control method may additionally include generating an image which corresponds to the text input-related information based on the result of the analysis and transmitting the same to the client apparatus.

An exemplary embodiment may further provide a client apparatus for operating in communication with a server, the client apparatus including: a user interface which receives input text information; a communication interface which transmits received input text to the server; the server includes a controller which analyzes the input text; the server includes a storage which receives and stores a result of the analysis; and wherein controller performs control operations so that, in response to the text input being received via user interface after the result of the received analysis, the type of the received text is converted based on the stored result of the analysis. The information related to a text input may include at least one of: a content of the text, location information at which the text is inputted and attribute information of the text.

A further exemplary embodiment may provide a server for performing communication with a client apparatus, the server including: a storage which stores information related to a user manipulation; a communication interface which receives from the client apparatus information relating to a text input; and a controller which analyzes the received information based on information stored at the storage and performs a control operation so that a result of the analysis is transmitted to the client apparatus. The user manipulation-related information may include at least one of location information at which the user's manipulation is generated and a type of user manipulation.

According to various exemplary embodiments, a client apparatus for displaying a work-related document through an application which executes an image, which may efficiently process the user-inputted text and may display the result.

BRIEF DESCRIPTION OF THE DRAWINGS

The above and/or other aspects of the inventive concept will be more apparent by describing certain exemplary embodiments of the inventive concept with reference to the accompanying drawings, in which.

DETAILED DESCRIPTION OF EXEMPLARY EMBODIMENTS

Certain exemplary embodiments of the inventive concept will now be described in greater detail, with reference to the accompanying drawings.

In the following description, same drawing reference numerals are used for the same elements even in different drawings. The matters defined in the description, such as detailed construction and elements, are provided to assist in a comprehensive understanding of the inventive concept. Accordingly, it is apparent that the exemplary embodiments of the inventive concept can be carried out without those specifically defined matters. Also, well-known functions or constructions are not described in detail since they would obscure the invention with unnecessary detail.

Figure 1:
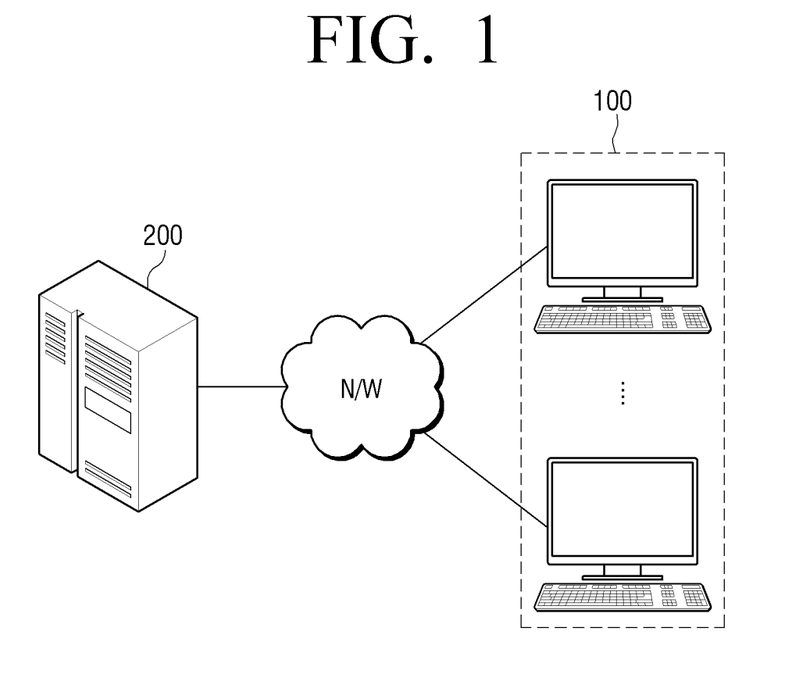
FIG. 1 illustrates a communication system which communicates between and a client apparatus under a general cloud display environment.

FIG. 1 illustrates a communication system which communicates between a server and one or more client apparatuses under a general cloud display environment.

Referring to FIG. 1, a communication system may include a plurality of client apparatuses 100 and a server 200. The plurality of client apparatuses 100 communicate with the server 200 under a cloud display environment. The server 200 controls the operations of the client apparatuses 100 by communicating with at least one of the client apparatuses 100.

By way of example, the server 200 of the communication system according to an exemplary embodiment may have all the applications implemented thereon, so that the client apparatuses 100 access the server 200 via a network to utilize intended applications at the server 200. According to the system of an exemplary embodiment, the client apparatuses 100 do not separately implement applications thereon, but access the server 200 having the applications implemented thereon via TCP/IP or IPX protocol, receive an image executed by an application which corresponds to the user request from the corresponding server 200, and output the resultant data on a display. Specifically, under a cloud display environment, the client apparatuses 100 connected to the server 200 may transmit a user command to the server 200 in response to receiving the user command via an input (not illustrated) such as a mouse or a keyboard. The server 200, in response to receiving the user command from the client apparatuses 100, may transmit to the client apparatuses 100, via the network the application executing data which corresponds to the user command. As a result, the client apparatuses 100 may display the image execute by the application, which was received from the server 200.

Depending on exemplary embodiments, a user command related to document work may be received at the client apparatuses 100 via an input (not illustrated), in which case the received user command is transmitted to the server 200 and the work-related document through an application executed image is received from the corresponding server 200 and is displayed on a screen. The user may utilize the application displayed on the screen of the client apparatuses 100 via the input (not illustrated).

As explained above, in one exemplary embodiment, the client apparatuses 100 may be implemented as thin or zero client apparatuses. That is, compared to a fat client apparatus, the client apparatuses 100 may employ a CPU with minimum function which operates to convert the application executed image, which is received from the server 200, into suitable form for output and display on a screen.

Although the client apparatuses 100 may drive an application stored at the server 200 and may receive the result, other embodiments are possible. Accordingly, the client apparatuses 100 may drive an operation system (OS) or application program stored at the server 200 and may receive and output the result of the driving of an operating system (OS) or application program.

The operation of displaying the result of processing a document on an image executed a work-related document application will be explained below, in which the image executed by the work-related document application is displayed on the screen of the client apparatus 100, under a conventional cloud display environment.

As explained above, under a cloud display environment, the server 200 of a communication system may have all the applications implemented thereon, and the client apparatus 100 accessing the server 200 may receive an image executed by an application which corresponds to a user command inputted from the corresponding server 200 via an input (not illustrated) and may display the resultant data.

In one exemplary embodiment, the client apparatus 100 may receive from the server 200 an image executed by a work-related document application and may display the same. In a state where the executed image of a work-related document application is displayed, the input (not illustrated) may receive a user-inputted text and text information including at least one of text setting information (e.g., styles, fonts, colors of the text) and may transmit the same to the client apparatus 100. After that, the client apparatus 100 may transmit the received text information to the server 200 and the server 200 may perform a rendering of the user-inputted text which is based on the received text information. The server 200 may then generate a resultant image of the work document with respect to the rendered text, and may transmit the generated image to the client apparatus 100. The client apparatus 100 may display the received resultant image of the work document. As a result, the user is assured that the text type is set according to his/her text setting command based on the resultant image of the displayed work document.

However, the above-explained series of operations has a shortcoming. That is, the result of user input does not rapidly appear. That is, the client apparatus 100 receives the result of the document work on the text received via the input (not illustrated) and displays the same. Accordingly, the user does not feel that he/she has speedy processing that he/she used to have when working on a document job using a fat client apparatus, such as a general desk top.

The communication between the server 200 and the client apparatus 100 under a conventional cloud display environment has been explained above. Herein below, the client apparatus 100 and the server 200 under a cloud display environment according to an exemplary embodiment will be explained in detail.

Figure 2:
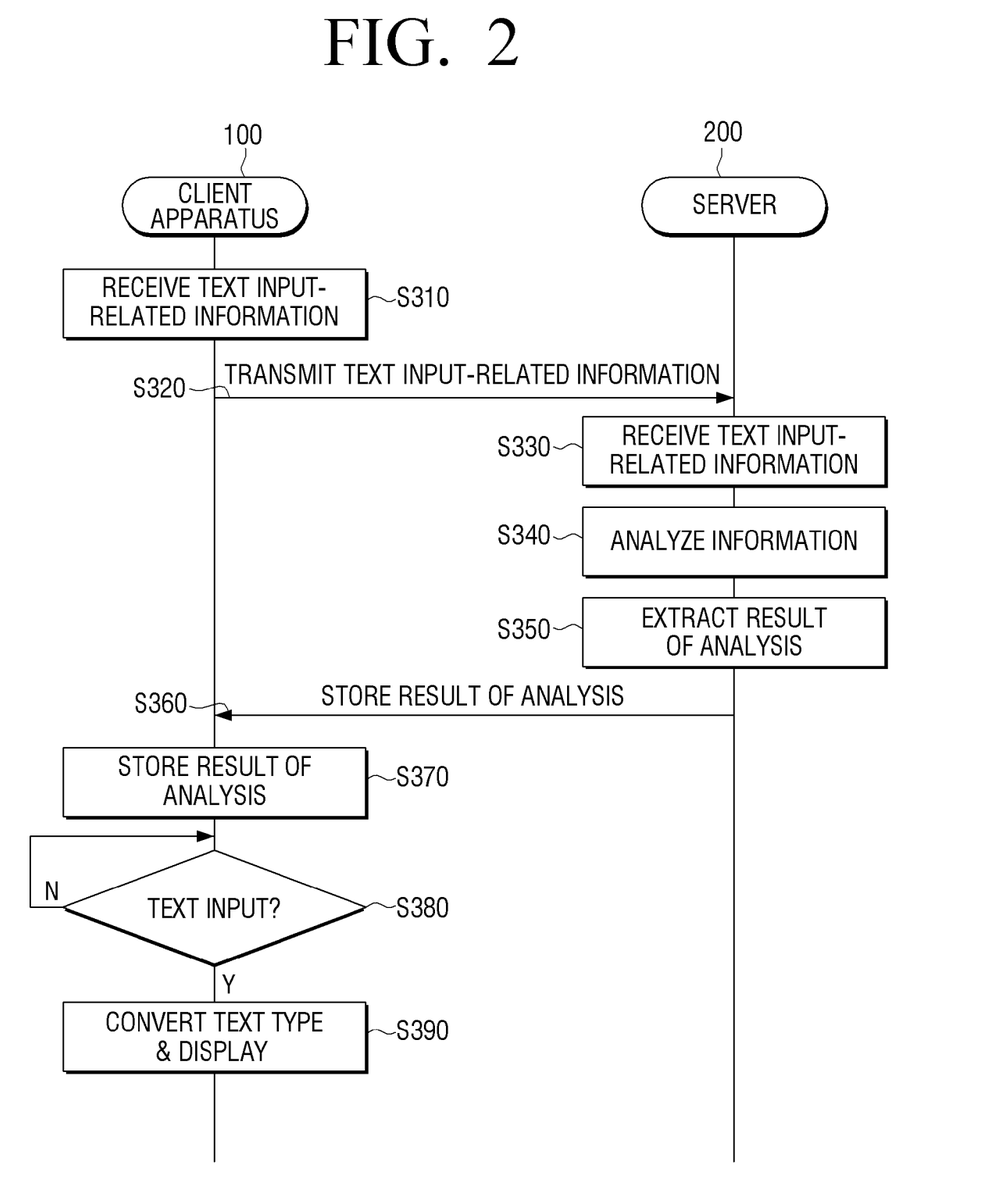
FIG. 2 is a flowchart which explains communication between a client apparatus and a server in order to achieve speedier processing of an input under a cloud display environment, according to an exemplary embodiment.

FIG. 2 is a flowchart which explains communication between a client apparatus and a server in order to achieve speedier processing of an input under a cloud display environment according to an exemplary embodiment.

Referring to FIG. 2, in response to a user command, the client apparatus 100 may receive from the server 200 and display an image executed on a work-related document application. At S310, S320, in a state where the image executed by a work-related document application is displayed, the client apparatus 100 may receive a user-inputted text from an input (not illustrated) such as a keyboard or mouse, as well as information related to the inputted text and may transmit the received data to the server 200.

Specifically, the input (not illustrated) such as a keyboard or mouse may transmit to the client apparatus 100 the user-inputted text, as well as a command to set the attributes of the text. The 'command to set the attributes of the text' as used herein may include a command to set the font, thickness or color of the text. Meanwhile, according to the text and the command to set the attributes of the text received from the input (not illustrated), the client apparatus 100 may generate information related to the text input and may transmit the same to the server 200. The 'information related to the text input' as used herein may include at least one of content of the user-inputted text, location information at which the text is inputted, and text attribute information to set the font, thickness or color of the text.

At S330, S340, the server 200, in receipt of the text input-related information, may analyze the information relating to the text input which is received from the client apparatus 100, based on pre-stored information. At S350, S360, the server may then extract a result of analysis relating to the received text input-related information and may transmit the extracted result to the client apparatus 100. At S370, the client apparatus 100 may receive the result of the analysis relating to the text input-related information and may store the same.

Specifically, the server 200 may store information related to user manipulation which is made with respect to a text input screen provided by the client apparatus 100. By way of example, the server 200 may preset information on respective texts, location information at which the respective texts are to be displayed, and text attribute information such as font, thickness or color of the text, and may store the same.

Accordingly, on receiving the information related to the text input from the client apparatus 100, the server 200 may analyze the information related to the text input based on the information which is preset and pre-stored. After that, the server 200 extracts mapping information of the information related to the text input, and transmits the result of the analysis to the client apparatus 100, and the client apparatus 100 may store the result of the analysis received from the server 200. Meanwhile, at S380, after receiving the result of the analysis from the server 200 or pre-storing the received result of analysis, the client apparatus 100 may check as to whether or not a text input is received via the input (not illustrated). In response to the result of checking indicating that the text input is received via the input (not illustrated), the client apparatus 100 at S390 may convert the type of the text received from the input (not illustrated) based on the pre-stored result of the analysis and may display the result.

As explained above, in one exemplary embodiment the client apparatus 100 may receive from the server 200 the result of the analysis on the text input-related information which is received via the input (not illustrated), internally convert the type of the received text based on the received result of the analysis and may display the result. As a result, the user is provided with the same level of speedy document processing as he/she used to have with a fat client apparatus, such as a desk top computer.

The operation of communicating between the client apparatus 100 and the server 200 to provide users with an improved feeling in relation to text input under a cloud display environment, has been explained above. Herein below, the client apparatus 100 and the server 200 according to an exemplary embodiment will be explained in greater detail with reference to the accompanied drawings.

Figure 3:
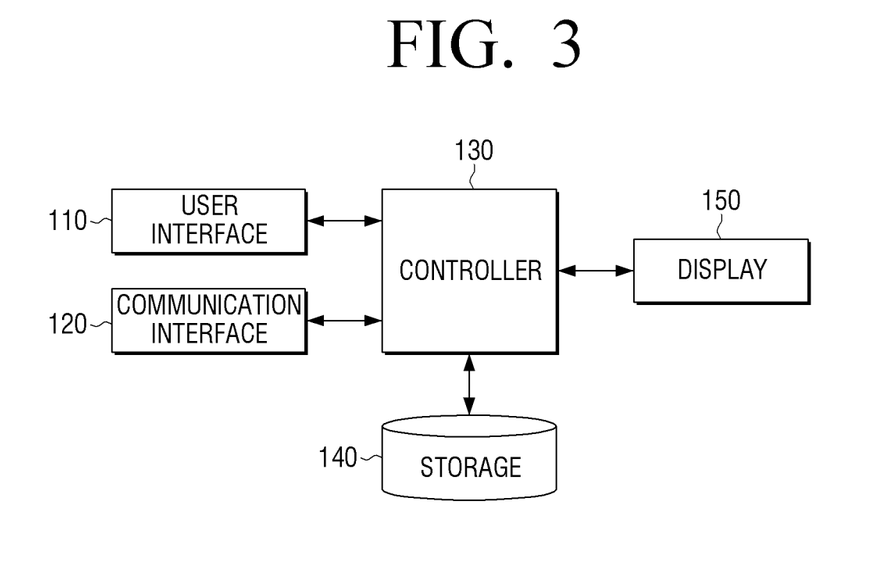
FIG. 3 is a block diagram of a client apparatus according to an exemplary embodiment.

FIG. 3 is a block diagram of a client apparatus according to an exemplary embodiment.

Referring to FIG. 3, the client apparatus 100 may include a user interface 110, a communication interface 120, a controller 130, a storage 140 and a display 150. As explained above with reference to FIG. 1, the client apparatus 100 may be implemented as a thin client or zero client apparatus, which may preferably be a display apparatus networked with the server and which operates to output an image.

The user interface 110 may receive a text input by the user. Specifically, the user interface 110 may receive a text input received from the user via an input (not illustrated), such as a keyboard or a mouse. By way of example, the user may input a text "Samsung" via the input (not illustrated) such as a keyboard. Alternatively, the user may select a job tool menu implemented on the work-related document through an application executed image which is then displayed on the screen, using the input (not illustrated), such as a mouse to thereby set the attributes (e.g., font or color of the text) of the text "Samsung."

Accordingly, the user interface 110 may receive the text inputted via the input (not illustrated) as well as setting information, to set the attributes of the text. However, an exemplary embodiment is not limited to any specific example of carrying this out. Accordingly, the user interface 110 may receive a user command from the input (not illustrated) regarding execution of an application as requested by the user.

The communication interface 120 may transmit the information related to the text input to the server 200. The 'information related to text input' as used herein may include at least one of the content of the user-inputted text, location information at which the text is inputted, and the text attribute information. By way of example, the user may input text "Samsung" via the input (not illustrated), set the style of the text to "Times New Roman," and may also set the font of the text to "10." In response to the text and the setting information to set the attributes of the text being received via the user interface 110, the communication interface 120 may transmit to the server 200 the text input-related information including the content of the text (i.e., "Samsung"), the location information at which the text "Samsung" is inputted, and the text attribute information such as "Times New Roman" and "font size 10," as set by the user.

However, an exemplary embodiment is not limited to any specific example of carrying this out. Accordingly, the communication interface 120 may transmit an application executed command to the server 200 according to the user command received from the input (not illustrated) via the user interface 110. The communication interface 120 may include a wired communication port such as a network interface card (not illustrated) which communicates with the server 200. However, an exemplary embodiment is not limited to any specific example of carrying this out. Accordingly, the communication interface 120 may include a wireless communication module which supports a communication network such as 3G network or wi-fi network in order to communicate with the server 200.

The controller 130, which may be implemented as a central processing unit (CPU), may control the overall operation of the client apparatus 100. In one exemplary embodiment, in response to a user command being received via the user interface 110 regarding executing a document work-related application, the controller 130 may control the communication interface 120 to transmit to the server 200 a command to execute a document work-related application which corresponds to the user command. Thereafter, in response to the image executed by the work-related document application being received from the server 200, the controller 130 controls display of the executed image so that the image is displayed through the display 150.

As explained above, in response to the text input-related information being transmitted to the server 200 via the communication interface 120 and the result of analysis being received, the controller 130 may control the storage 140 to store the received result of the analysis. Accordingly, the storage 140 may store the result of the analysis received from the server 200. The phrases 'result of analysis' as used herein refers to the information generated at the server 200. Specifically, the server 200 may store user manipulation-related information on the text input screen provided by the client apparatus 100, i.e., with respect to the image executed by the work-related document application. For example, the server 200 may preset and pre-store the content of the respective texts, location information at which the respective texts are to be displayed, as well as text attribute information for setting the font and thickness or color of the texts.

Accordingly, in response to the text input-related information being received from the client apparatus 100, the server 200 may analyze the text input-related information based on the information which is preset and pre-stored. Thereafter, the server 200 may extract the mapping information of the text input-related information from among the information preset and pre-stored, and may transmit the result of the analysis to the client apparatus 100. Accordingly, in response to the result of the analysis relating to the text input-related information being received from the server 200 via the communication interface 120, the controller 130 controls the storage 140 to store the received result of the analysis.

Meanwhile, in response to the text input being received via the user interface 100 after the result of the analysis is received or stored, the controller 130 may convert the type of the received text based on the result of the analysis stored in the storage 140. Thereafter, the controller 130 may overlay the converted text on the image executed by the work-related document application and may control the display 150 to display the result. The display 150 may be implemented in the form of a liquid crystal display (LCD), organic light emitting display (OLED), a plasma display panel (PDP), etc., in order to display the image executed by the work-related document application received from the server 200. Additionally, the display 150 may display the image executed by the work-related document application on which the text, which is converted based on the result of the analysis, is overlaid.

The controller 130 may control the communication interface 120 to transmit to the server 200 the information which corresponds to the user's additional manipulation, in response to receiving the user's additional manipulation related to the text input, via the user interface 110. Thereafter, the controller 130 may control the display to display the same, in response to receiving an image which corresponds to the user's additional manipulation being received from the server 200, via the communication interface 120.

In one exemplary embodiment, where the inputted text is converted based on the result of the analysis, and the converted text is overlaid and displayed on the image executed by the work-related document application, a user's additional manipulation which is entered may be received via the user interface 110. In response the user's enter-related additional manipulation being received, according to the control command from the controller 130, the communication interface 120 may transmit to server 200 the user's additional manipulation. Accordingly, as explained above, the server 200 extracts the mapping information of the user's additional manipulation from the preset and pre-stored information, and may determine the received user's additional manipulation which is related to the entered command. Accordingly, the server 200 transmits to the client apparatus 100 the image executed by the work-related document application, on which the enter operation is performed.

Accordingly, the display 150 of the client apparatus 100 displays the image executed by the work-related document application on which the enter operation is performed, which is received from the server 200. Thereafter, in response to a user-inputted text being received via the input (not illustrated), the display 150 may overlay the text, which is converted based on the pre-stored result of analysis of the storage 140, on the next line of the image executed by the work-related document application and may display the result.

In response to a user's text-related additional manipulation being received, the controller 130 may transmit to the server 200 the information which corresponds to the user's additional manipulation, via the communication interface 120. Thereafter, in response to the result of analysis being received from the server 200, which is related to the user's additional manipulation, the controller 130 may control the storage 140 to update the pre-stored information based on the received result of the analysis.

In one exemplary embodiment, the user's additional manipulation relating to text setting-related information, including at least one of the text setting-related information (e.g., style, font or color of the text) may be received via the user interface 110, in a where that the inputted text is converted based on the result of the analysis and the converted text is overlaid and displayed on the image executed by the work-related document application. In response to the user's additional manipulation being received, the controller 130 may transmit to the server 200 the user's additional manipulation which has been received. Accordingly, as explained above, the server 200 may extract the mapping information of the user's additional manipulation from the preset and pre-stored information and may determine that the received user's additional manipulation relates to text setting information. As a result, the server 200 may transmit to the client apparatus 100 the result of the analysis relating to the received user's additional manipulation.

In response to the result of analysis being received from the server 200 with respect to the user's additional manipulation, the controller 130 controls the storage 140 to update the pre-stored result of analysis based on the currently-received result of the analysis. Accordingly, in response to the user-inputted text being received via the input (not illustrated) after the result of the analysis is updated, the display 150 may convert the received text based on the updated result of analysis and may overlay and display the converted text on the image executed by the work-related document application.

Accordingly, the display 150 may display the image executed by the work-related document application with the text, which is converted based on the results of the analysis before and after updating, overlaid thereon.

The constitution of the client apparatus according to an exemplary embodiment has been explained above. Herein below, a method of controlling the client apparatus 100 which is in communication with the server 200, will be explained in detail.

Figure 4:
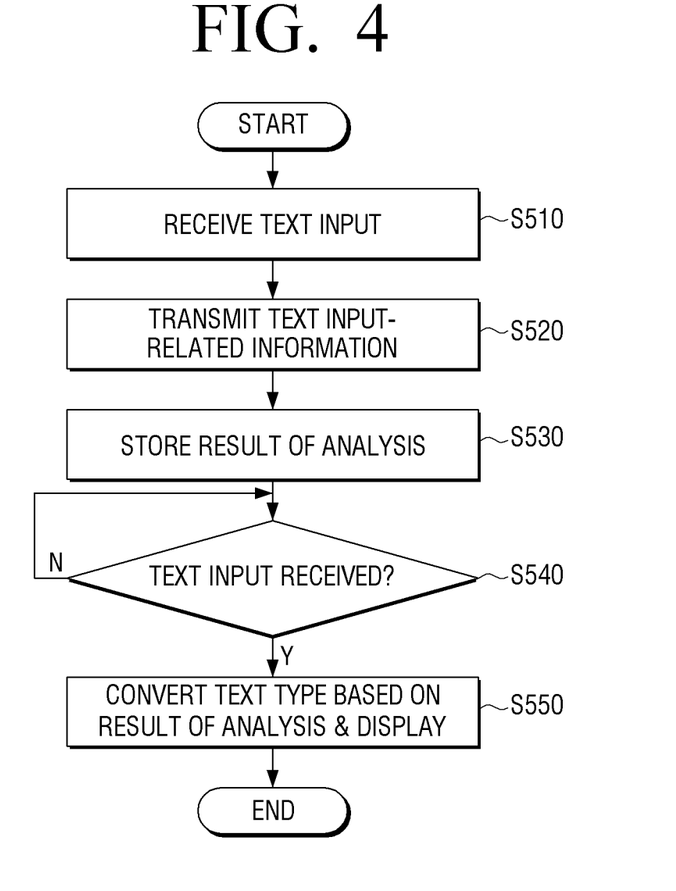
FIG. 4 is a flowchart which explains a method of controlling the client apparatus which operates in communication with the server, according to an exemplary embodiment.

FIG. 4 is a flowchart which explains a method of controlling the client apparatus which operates in communication with the server, according to an exemplary embodiment.

Referring to FIG. 4, the client apparatus 100 may be implemented as a thin client or zero client apparatus, which may preferably be a display apparatus networked with the server 200 and which operates to output an image. The client apparatus 100 may receive from the server 200 the image executed by the work-related document application which implements thereon a plurality of applications, and may display the received image. At S510, a text input is received at the client apparatus 100, in a state where the image executed by the work-related document application is displayed. Specifically, the client apparatus 100 may receive a user-inputted text, which is received via an input (not illustrated), such as a keyboard or a mouse. By way of example, the user may input the text "Samsung" to the input (not illustrated), such as a keyboard. Further, the user may set the attribute (e.g., font or color of the text) of the text "Samsung" using an input (not illustrated) such as a mouse. Specifically, the user may select a job tool menu provided on the image executed by the work-related document application which is displayed on the screen of the client apparatus 100, by using an input (not illustrated) such as a mouse.

Accordingly, in response to the information related to the user's text input being received via the input (not illustrated), at S520, the client apparatus 100 may transmit to the server the information related to the received text input. The 'text input-related information' as used herein may include at least one of the content of the user-inputted text, location information at which the text is inputted and text attribute information. For example, the user may input the text "Samsung" via the input (not illustrated), and set "Times New Roman" for the style of the text "Samsung," while setting the font at "10". In response to the text and the information to set the attributes of the text being received from the input (not illustrated), the client apparatus 100 may transmit to the server 200 the content of the text (i.e., "Samsung"), the location at which the text "Samsung" is inputted, and the text attribute information as set by the user ("Times New Roman" and "font 10").

Thereafter, in response to the result of the analysis received from the server 200, which relates to the text input-related information, at S530, the client apparatus 100 may store the received result of the analysis. The "result of the analysis" as used herein refers to the information generated at the server 200. Specifically, the server 200 may store the information related to the user manipulation which is made with respect to the text input screen, i.e., the image executed by the work-related document application provided by the client apparatus 100.

For example, the server 200 may preset and pre-store the information relating to the respective texts, location information at which the respective texts are to be displayed, and text attribute information to set the font, thickness or color of the texts. Accordingly, in response to the text input-related information being received from the client apparatus 100, based on the preset and pre-stored information, the server 200 may analyze the information related to the input text. Thereafter, the server 200 may extract the mapping information of the information related to the input text from the preset and pre-stored information, and may transmit the result of the analysis to the client apparatus 100. Accordingly, the client apparatus 100 may receive from the server 200 the result of the analysis of the information related to the input text and may store the same.

After the result of analysis is received or stored, at S540, the client apparatus 100 may check as to whether or not the user-inputted text is received via an external device (not illustrated). In response to the result of the checking indicating that the user-inputted text is received, the client apparatus 100 may convert the type of the received text based on the pre-stored result of the analysis. At S550, the client apparatus 100 may overlay the text, which is converted based on the result of the analysis, on the image executed by the work-related document application i.e., the text input screen, and may display the result.

In overlaying the text which is converted based on the pre-stored result of the analysis on the image executed by the work-related document application executing image and displaying the result, the client apparatus 100 may perform the following operations depending on a user's additional manipulation.

Figure 5:
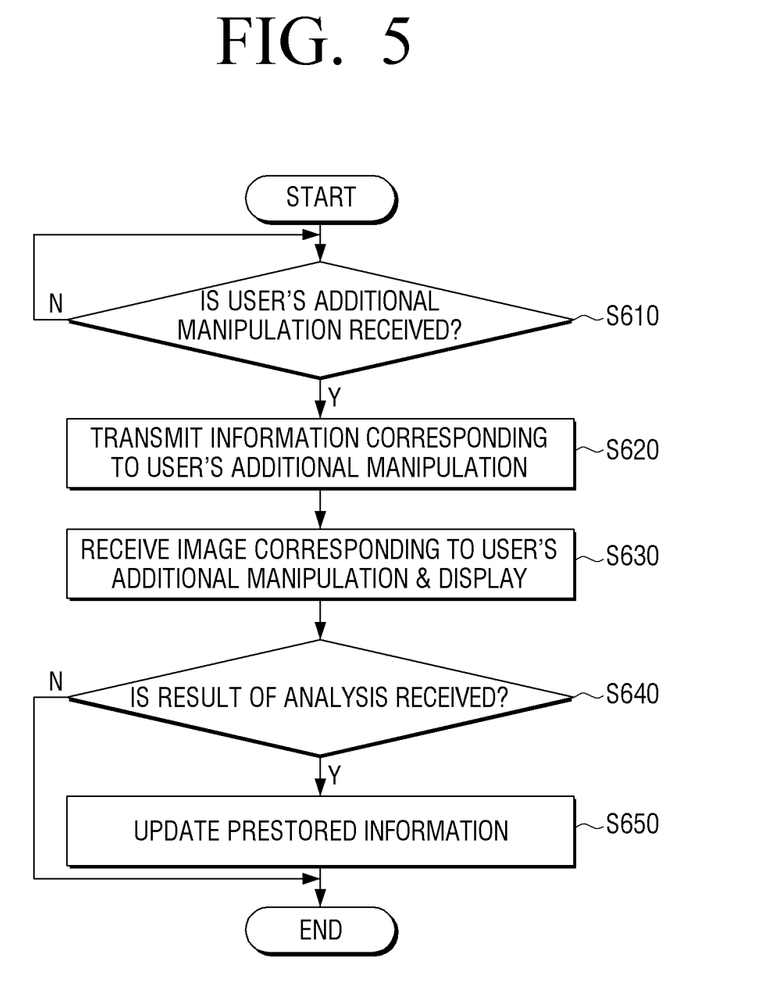
FIG. 5 is a flowchart which explains an operation of the client apparatus performed in accordance with the additional user manipulation, according to an exemplary embodiment.

FIG. 5 is a flowchart which explains to explain an operation of the client apparatus which is performed in accordance with the user's additional manipulation, according to an exemplary embodiment.

As explained above with reference to FIG. 4, the client apparatus 100 may convert the received text based on the pre-stored result of the analysis and may overlay and display the converted text on the image executed by the work-related document application, in response to the text being inputted after the result of analysis on the text input-related information being stored or received from the server 200. Accordingly, at S610, the client apparatus 100 may check to determine whether or not a user's additional manipulation is received from the input (not illustrated) in a state where the image executed by the work-related document application with the text overlain thereon is displayed.

At S630, in response to the result of checking indicating that the user's additional manipulation related to the text input is received, the client apparatus 100 may transmit to the server 200 the information which corresponds to the user's additional manipulation and may receive from the server 200 an image which corresponds to the user's additional manipulation and may display the received image.

In one exemplary embodiment, the client apparatus 100 may receive an additional manipulation input by a user via an input (not illustrated). In response to the user's additional manipulation being entered and received, the client apparatus 100 may transmit manipulation to the server 200 the received from the user additional manipulation to the server 200. The server 200 in receipt of the user's additional manipulation, may extract the mapping information of the user's additional manipulation from the preset and pre-stored information, and may determine that the received user's additional manipulation relates to a command entered by a user. Accordingly, the server 200 may transmit the document work-related application executing image to the client apparatus 100. The client apparatus 100 may display the document work-related application executing image on which the enter operation received from the server 200 is implemented. Thereafter, in response to the user-inputted text being received via an input (not illustrated), the client apparatus 100 may overlay the text which is converted based on the pre-stored result of the analysis, on the next line of the document work-related application executing image and may display the result.

Meanwhile, the user's additional manipulation inputted through the input (not illustrated) at S610 may relate to a command related to text input. In response to the user's text-related additional manipulation is received, the client apparatus 100 may transmit to the server 100 the received user's additional manipulation. Thereafter, at S640, S650, the client apparatus 100 checks to determine whether the result of the analysis relating to the user's text-input manipulation is received from the server 200, and if so, may update the pre-stored result of the analysis into the currently-received result of analysis.

As explained above, in response to the user-inputted text being received via an input (not illustrated) after the result of the analysis is updated, the client apparatus 100 may convert the received text which is based on the updated result of the analysis and may overlay the converted text on the image executed by the work-related document application and may display the result. Accordingly, the client apparatus is able to display the image executed by the work-related document application with the text overlaid thereon, in which the text is converted based on the results of the analysis before and after the update.

The method of controlling the client apparatus 100 which operates in communication with the server 200 has been explained so far. Hereinafter, a server 200 which communicates with the client apparatus 100 and a control method according to an exemplary embodiment will be explained in detail.

Figure 6:
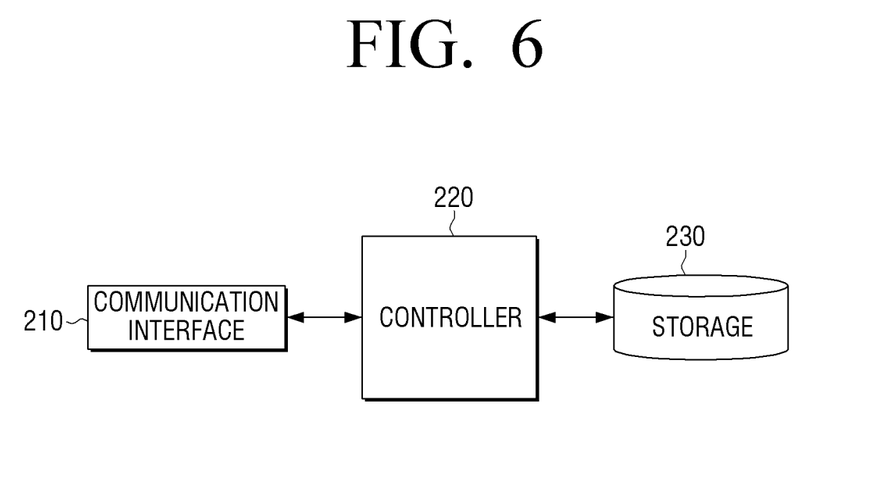
FIG. 6 is a block diagram of a server which communicates with a client apparatus according to an exemplary embodiment.

FIG. 6 is a block diagram of a server which communicates with a client apparatus, according to an exemplary embodiment.

Referring to FIG. 6, the server 200 may include a communication interface 210, a controller 220 and a storage 230.

The communication interface 210 may receive from the client apparatus 100 information related to a text input. Specifically, the communication interface 210 may receive from the client apparatus 100 the information related to a text input, including at least one of the content of the text, the location information at which the text is inputted, and the text attribute information.

Accordingly, the communication interface 210 may include a wired communication port such as a network interface card (not illustrated) or a wireless communication module to support a communication network such as a 3G network or a wi-fi network in order to communicate with the client apparatus 100.

The storage 230 may store the information related to a user manipulation which is made with respect to the text input screen, i.e., document work-related application executing image provide by the client apparatus 100. The information related to a user manipulation may include at least one of the location information at which the user's manipulation is generated, as well as the type of user manipulation. By way of example, the location information at which the user's manipulation is generated may be the location of the text displayed on the image executed by the work-related document application provided by the client apparatus 100. The type of user manipulation may include the text attribute information which sets the font, thickness or color of the text displayed on the document work-related application executing image provided by the client apparatus 100.

The storage 230 which stores the user manipulation-related information may store at least one of various applications to drive the server 200, OS programs and application programs.

Accordingly, the storage 230 may include at least one type of storage medium including flash type memory, hard disk memory, multimedia card micro memory, memory card (e.g., SD or XD memory), RAM or ROM.

The controller 220 may control the overall operation of the server 200 and may analyze the information received from the client apparatus 100 based on the information stored at the storage 230, and may control the communication interface 210 to transmit the result of the analysis to the client apparatus 100. Specifically, the controller 220 may execute an application in response to a request by the client apparatus 100. In one exemplary embodiment, in response to a request for executing a document work-related application being received from the client apparatus 100 via the communication interface 210, the controller 220 may transmit to the client apparatus 100, among the pre-stored applications, the image executed by the work-related document application executing image which corresponds to the received request for execution. Thereafter, in response to the text input-related information being received from the client apparatus 100, the controller 220 may extract mapping information of the received text input-related information from among the pre-stored information of the storage 230, and may perform a control function so that the result of the analysis is transmitted to the client apparatus 100.

For example, in response to the user inputting the term "Samsung" via an input (not illustrated) and setting "Times New Roman" for the style of the text "Samsung" and also setting font size "10," the client apparatus 100 may transmit the information relating to the input text, including the content of the text (i.e., "Samsung"); to the location information at which the text "Samsung" is inputted, and "Times New Roman" and "font size 10" to the server 200. In response to receiving the information related to input text, the controller 220 may extract the mapping information of the received text information from the pre-stored user manipulation-related information and may transmit the result of the analysis to the client apparatus 100.

The controller 220 may perform a control operation so that an image which corresponds the text input-related information is generated based on the result of analysis of the text which is related to the input, information and is transmitted to the client apparatus 100. By way of example, the user may input an enter command via an input (not illustrated), in which case the client apparatus 100 may transmit to the server 200 text which is information related to the input relating to the enter command. In response to receiving the information related to the input text, from among the pre-stored user manipulation-related information of the storage 230, the controller 220 may extract the mapping information related to the input text information and may determine that the received information relates to the command to enter the information. Accordingly, the controller 220 may execute control functions so that an image executed by the work-related document application on which the enter operation is implemented, is generated and transmitted to the client apparatus 100.

Accordingly, after receiving the image executed by the work-related document application, on which the enter operation is implemented, the client apparatus 100 may overlay the text thereafter received on the next line of the image executed by the work-related document application and display the result.

Figure 7:
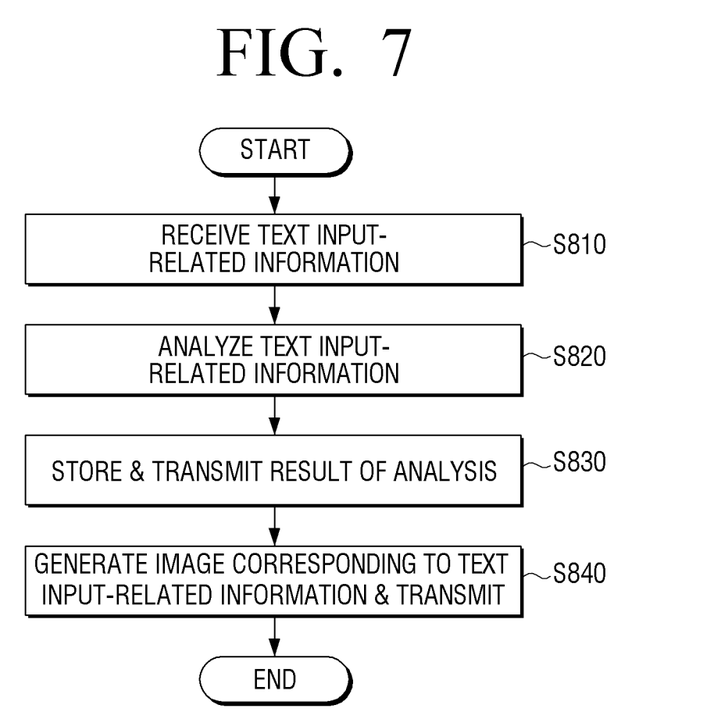
FIG. 7 is a flowchart which explains a method of controlling a server in order to control the operation of the client apparatus in communication with the client apparatus, according to an exemplary embodiment.

FIG. 7 is a flowchart which explains a method of controlling a server which controls the operation of a client apparatus in communication with another client apparatus, according to an exemplary embodiment.

Referring to FIG. 7, at S810, the server 200 may receive information related to input text from the client apparatus 100. Specifically, the server 200 may receive from the client apparatus 100 the information related to the text input which includes at least one of the text content, location information at which the text is inputted and the text attribute information.

In response to the text input-related information being received, at S820, the server 200 may analyze the received text information based on the pre-stored user information related to a user manipulation which is made with respect to the text input screen provided by the client apparatus 100. At S830, the server 200 may transmit the result of the analysis to the client apparatus 100, and may store the same.

The screen with the text provided by the client apparatus 100 may be a image executed by the work-related document application that is transmitted to the client apparatus 100 in response to the request by the client apparatus 100. The information related to a user manipulation may include at least one of the location at which the user's manipulation information is generated and the type of user manipulation. By way of example, the location at which the user's manipulation information is generated may be the location of the text displayed on the image executed by the work-related application which is provided by the client apparatus 100. The type of user manipulation may be a text attribute information to set the font, thickness or color of the text displayed on the document work-related application executing image, which is provided by the client apparatus 100.

Accordingly, in response to receiving the text input-related information from the client apparatus 100, the server 200 may extract the mapping information of the received information relating to the input text, from the pre-stored information related to the user's manipulation, and may transmit the result of such analysis to the client apparatus 100.

For example, in response to the user inputting the text "Samsung" via the input (not illustrated), and setting "Times New Roman" for the style of the text "Samsung" and also setting font size "10" for the text, the client apparatus 100 may transmit to the server 200 the text information related to the input text including the content of the text (i.e., "Samsung"), the location information at which the text "Samsung" is inputted, and the text attribute information as set by the user such as "Times New Roman" and "font size 10." In response to receiving the text input-related information, the server 200 may extract the received information related to an input text, based on the information related to the user manipulation with respect to the image executed by the work-related document application, from the pre-stored information related to the user manipulation, and may transmit the result of analysis to the client apparatus 100.

At S840, the server 200 may generate an image which corresponds to the information related to the input text, which is based on the result of analysis on the information related to the input text and may transmit the same to the client apparatus 100. In one exemplary embodiment, the server 200 may receive from the client apparatus 100, an additional user manipulation, after transmitting the result of the analysis to the client apparatus 100. By way of example, the user may input an enter command via the input (not illustrated), in which case the client apparatus 100 may transmit to the server 200 the additional manipulation by the user, which is related to the enter command. In response to receiving the user's additional manipulation, as explained above at S820, the server 200 may determine that the received additional manipulation from the user relates to a command related to the user entering information, by utilizing the pre-stored user manipulation-related information. Accordingly, the server 200 may generate an image executed by the work-related document application on which the enter operation is implemented, and may transmit the result to the client apparatus 100.

Accordingly, the client apparatus 100, which receives the image executed by the work-related document application, on which the enter operation is implemented, may overlay the text received thereafter via the input (not illustrated) on the next line of the image executed by the work-related document application and may display the result.

A program to implement a method according to various exemplary embodiments may be stored on various types of recording media to be used.

Specifically, the codes to implement the methods explained above may be stored on various types of non-transitory computer-readable recording media such as random access memory (RAM), flash memory, read only memory (ROM), erasable programmable ROM (EPROM), electronically erasable and programmable ROM (EEPROM), register, hard disk, removable disk, memory card, USB memory, or CD-ROM.

The foregoing exemplary embodiments and advantages are merely exemplary and are not to be construed as limiting the present inventive concept. The present teaching can be readily applied to other types of apparatuses. Also, the description of the exemplary embodiments of the inventive concept is intended to be illustrative, and not to limit the scope of the appended claims.

What is claimed is:

1. A client apparatus for operating in communication with a server, the client apparatus comprising:
a display;
a user interface which receives input text information provided by a user;
a communication interface which transmits the input text information to the server which performs an analysis of the transmitted input text information by extracting mapping information;
a storage which receives a result of the analysis of the input text information comprising the mapping information which is transmitted from the server and stores the same; and
a controller, which, in response to the input text information being received via the user interface after the result of the received analysis are stored in the storage, converts the type of the received input text information based on the stored result of the analysis before being displayed by the display.

2. The client apparatus of claim 1, wherein the input text information comprises at least one of a content of the text, location information at which the text is inputted and attribute information of the text.

3. The client apparatus of claim 1, wherein, in response to a user's additional manipulation related with the text input information being received, the controller transmits to the server additional information related to the user manipulation, and performs a control function so that an image which corresponds to the user's additional manipulation is received from the server and is displayed.

4. The client apparatus of claim 3, wherein the controller receives from the server a result of the analysis of the user's additional manipulation and performs a control operation so that the information stored at the storage is updated based on the result of the received analysis of the user's additional manipulation.

5. The client apparatus of claim 1, wherein the client is a thin client operating in a zero client environment.

6. A server for performing communication with a client apparatus, the server comprising:
a storage which stores user manipulation-related information related to a user manipulation which is made with respect to a text input screen provided by the client apparatus;
a communication interface which receives input text related information from the client apparatus; and
a controller which performs and analysis of the received input text related information based on the information stored at the storage and performs a control operation so that a result of the analysis is transmitted to the client apparatus,
wherein the controller performs a control operation so that mapping information of the input text related information is extracted from the user manipulation-related information and is transmitted to the client apparatus.

7. The server of claim 6, wherein the server handles computations and storing for the client, which is a thin client.

8. The server of claim 6, wherein the input text related information comprises at least one of a content of the text, location information at which the text is inputted and text attribute information.

9. The server of claim 6, wherein the user manipulation-related information comprises at least one of location information at which the user's manipulation is generated and a type of user manipulation.

10. The server of claim 6, wherein the controller performs a control operation so that an image which corresponds to the input text related information is generated based on the result of the analysis and is transmitted to the client apparatus.

11. A method of controlling a client apparatus for operating in communication with a server, the method comprising:
receiving input text information provided by a user;
transmitting to the server the input text information;
receiving from the server a result of an analysis of the transmitted input text information comprising extracting mapping information from the input text information, wherein the result of the analysis comprises mapping information and storing the result of the analysis; and
in response to the text input information being received after the result of the received analysis is stored, converting a type of the received text, based on the stored result of the analysis, before displaying the converted text.

12. The control method of claim 11, wherein the text input-related information comprises at least one of a content of the text, location information at which the text is inputted and attribute information of the text.

13. The control method of claim 11, further comprising:
in response to a user's additional manipulation related to the input text information being received, transmitting additional information to the server which is related to the user manipulation; and
receiving from the server an image which corresponds to the user's additional manipulation and displaying the image.

14. The control method of claim 13, wherein, in response to receiving from the server a result of the analysis of the user's additional manipulation, updating the information stored at the storage based on the received result of the analysis.

15. A method of controlling a server which controls the operation of a client apparatus in communication with another client apparatus, the control method comprising:
receiving information related to input text related information from the client apparatus;

analyzing the received input text related information based on pre-stored information related to a user manipulation which is made with respect to a text input screen provided by the client apparatus; and transmitting to the client apparatus a result of the analysis, wherein the analyzing comprises extracting mapping information from the information related to the input text from the user manipulation and storing the extracted mapping information.

16. The control method of claim 15, wherein information related to the input text comprises at least one of a content of the text location information at which the text is inputted and text attribute information.

17. The control method of claim 15, wherein the input text information related to a user manipulation comprises at least one of location information at which the user's manipulation is generated and a type of user manipulation.

18. The control method of claim 15, further comprising generating an image which corresponds to the input text related information which is information based on the result of the analysis and transmitting the image to the client apparatus.

19. A client apparatus for operating in communication with a server, the client apparatus comprising:
- a user interface which receives input text information provided by a user;
- a communication interface which transmits the received input text information to the server, wherein the server analyzes the transmitted input text information by extracting mapping information and stores a result of the analysis comprising the extracted mapping information, and wherein in response to the input text information being received via the user interface after the result of the analysis is stored, the type of the received text information is converted based on the stored result of the analysis and the converted text information is transmitted to the client via the communication interface.

20. The client apparatus of claim 19, wherein the information related to a text input comprises at least one of: a content of the text, location information at which the text is inputted and attribute information of the text.

21. A server for performing communication with a client apparatus, the server comprising:
- a storage which stores information related to a user manipulation;
- a communication interface which receives from the client apparatus information relating to an input text; and
- a controller which performs an analysis of the received information based on information stored at the storage by extracting mapping inf ation and performs a control operation so that a result of the analysis comprising the mapping information is transmitted to the client apparatus.

22. The server of claim 21, wherein the user manipulation-related information comprises at least one of location information at which the user's manipulation is generated and a type of user manipulation.

* * * * *